US012800718B2

(12) United States Patent
Neidhardt et al.

(10) Patent No.: US 12,800,718 B2
(45) Date of Patent: Nov. 17, 2026

(54) SYSTEM AND METHOD FOR CHARACTERIZING A RADAR TARGET SIMULATOR

(71) Applicant: Rohde & Schwarz GmbH & Co. KG, Munich (DE)

(72) Inventors: Steffen Neidhardt, Dorfen (DE); Maximilian Bogner, Munich (DE); Gerhard Hamberger, Griesstaett (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 189 days.

(21) Appl. No.: 18/823,433

(22) Filed: Sep. 3, 2024

(65) Prior Publication Data

US 2026/0063762 A1 Mar. 5, 2026

(51) Int. Cl.
*G01S 7/41* (2006.01)
*G01S 7/40* (2006.01)

(52) U.S. Cl.
CPC ............ *G01S 7/412* (2013.01); *G01S 7/4082* (2021.05)

(58) Field of Classification Search
CPC .... G01S 7/4052; G01S 7/4078; G01S 7/4082; G01S 7/412
See application file for complete search history.

(56) References Cited

U.S. PATENT DOCUMENTS 4,517,569 A * 5/1985 Gerharz .................. G01S 13/75 342/6
6,037,897 A * 3/2000 Rittenbach ............ G01S 7/4052 342/170
6,114,985 A * 9/2000 Russell ................. G01S 7/4052 342/173
6,346,909 B1 * 2/2002 Johnson, Jr. .......... G01S 7/4052 342/170
6,710,737 B1 * 3/2004 Cronyn ................. G01S 7/4052 342/174

(Continued)

FOREIGN PATENT DOCUMENTS

CN 205210302 U 5/2016
CN 105738876 A 7/2016

(Continued)

*Primary Examiner* — Peter M Bythrow
(74) *Attorney, Agent, or Firm* — Studebaker Brackett PLLC

(57) ABSTRACT

A system for characterizing a radar target simulator is provided. The system includes a signal source that provides a known radar signal for the radar target simulator, and a signal receiver that receives the correspondingly reflected radar signal, caused by the known radar signal, from a front of the radar target simulator, and in addition to receive the correspondingly simulated radar response signal to the known radar signal from the radar target simulator and/or to measure the correspondingly outgoing simulated radar signal as response to the known radar signal from the radar target simulator. The system or the signal receiver characterizes the reflected radar signal and the simulated radar response signal and/or the outgoing simulated radar signal in time and/or frequency shift. The system or the signal receiver characterizes the simulated radar response signal and/or the outgoing simulated radar signal in frequency compared to the reflected radar signal.

20 Claims, 6 Drawing Sheets

(56) References Cited

U.S. PATENT DOCUMENTS

| | | | | |
|---|---|---|---|---|
| 7,782,250 | B2 * | 8/2010 | Shih | G01S 7/4052<br>342/170 |
| 10,852,394 | B2 * | 12/2020 | Salvesen | G01S 7/285 |
| 2014/0152490 | A1 * | 6/2014 | Lehning | G01S 7/4004<br>342/169 |
| 2016/0178733 | A1 * | 6/2016 | Langendorf | G01F 23/284<br>342/167 |
| 2022/0146627 | A1 * | 5/2022 | Fisch | G01S 7/4052 |

FOREIGN PATENT DOCUMENTS

| | | | |
|---|---|---|---|
| CN | 108107413 | A | 6/2018 |
| EP | 3812790 | A1 | 4/2021 |

* cited by examiner

SYSTEM AND METHOD FOR CHARACTERIZING A RADAR TARGET SIMULATOR

TECHNICAL FIELD

The present disclosure relates to a system for characterizing a radar target simulator and a method for characterizing a radar target simulator.

BACKGROUND ART

In times of an increasing number of radar sensors, exemplarily used in the context of autonomous driving, there is a growing need of radar target simulators for verifying correct functioning of such radar sensors, thereby leading also to a growing need of systems and methods for characterizing such radar target simulators.

For instance, CN 105738876 A discloses a device for calibrating the instantaneous doppler frequency offset of a pulse doppler (PD) radar seeker echo simulator, and the device comprise a frequency mixing module, a data collection module, a data analysis module and a parameter extraction module, wherein the frequency mixing module, the data collection module, the data analysis module and the parameter extraction module are coupled to each other. The frequency mixing module is used for the frequency mixing of an echo signal, and enabling a mixed signal to be transmitted to the data collection module. The data collection module enables the collected data to be transmitted to the data analysis module, and the data analysis module transmits the processed data to the parameter extraction module, and carries out calibration according to the data extracted by the parameter extraction module.

Disadvantageously, said device does not allow for characterizing a radar target simulator in a particularly accurate and efficient manner.

SUMMARY

Thus, there is a need to provide a system and a method for characterizing a radar target simulator in particularly accurate and efficient manner.

This is achieved by the embodiments provided in the enclosed independent claims. Advantageous implementations of the present disclosure are further defined in the dependent claims.

According to a first aspect of the present disclosure, a system for characterizing a radar target simulator is provided. Said system comprises a signal source configured to provide a known radar signal for the radar target simulator, and a signal receiver configured to receive the correspondingly reflected radar signal, caused by the known radar signal, from a front of the radar target simulator, and in addition to receive the correspondingly simulated radar response signal to the known radar signal from the radar target simulator and/or to measure the correspondingly outgoing simulated radar signal as response to the known radar signal from the radar target simulator. The system or the signal receiver is configured to characterize the reflected radar signal and the simulated radar response signal and/or the outgoing simulated radar signal in time and/or frequency shift. In addition to this or as an alternative, the system or the signal receiver is configured to characterize the simulated radar response signal and/or the outgoing simulated radar signal in frequency compared to the reflected radar signal.

Advantageously, a radar target simulator can be characterized in a particularly accurate and efficient manner. In particular, the system allows for a traceable characterization of radar target simulators for the parameters distance, velocity and radar cross section. Further advantageously, not only the radar target simulator can be characterized but also the radar target simulator with the corresponding air gap. As an additional advantage, it is noted that there is no need for any synchronization, thereby significantly increasing efficiency.

According to an implementation form of the first aspect of the present disclosure, the system or the signal receiver is configured to use the reflected radar signal and the simulated radar response signal and/or the outgoing simulated radar signal characterized in time and/or frequency shift for distance calibration of the radar target simulator. In addition to this or as an alternative, the front of the radar target simulator comprises or is a front end of the radar target simulator. Advantageously, for instance, distance calibration can be performed in a particularly accurate and efficient manner.

According to an implementation form of the first aspect of the present disclosure, the system or the signal receiver is configured to use the simulated radar response signal and/or the outgoing simulated radar signal characterized in frequency compared to the reflected radar signal for doppler calibration of the radar target simulator. Advantageously, for example, doppler calibration can be performed in a particularly accurate and efficient manner.

According to an implementation form of the first aspect of the present disclosure, the system comprises or is a measurement device comprising the signal source and/or the signal receiver. Advantageously, for instance, efficiency can further be increased.

According to an implementation form of the first aspect of the present disclosure, the measurement device comprises or is a time domain reflectometry measurement device, a spectrum analyzer, a vector network analyzer, or any combination thereof. Advantageously, for example, the measurement device could also be a network analyzer.

According to an implementation form of the first aspect of the present disclosure, the measurement device is power calibrated especially to calculate the corresponding radar cross section. Advantageously, for instance, radar cross section calculation can be achieved in a particularly accurate and efficient manner.

According to an implementation form of the first aspect of the present disclosure, the system or the signal receiver is configured to vary the corresponding radar cross section in the radar target simulator especially to calibrate across the respective range. Advantageously, for example, calibration can further be improved.

According to an implementation form of the first aspect of the present disclosure, the system or the signal receiver is configured to vary the corresponding doppler shift and/or distance in the radar target simulator especially to calibrate across different doppler distances. Advantageously, for instance, calibration can additionally be enhanced.

According to an implementation form of the first aspect of the present disclosure, the system and the radar target simulator are not synched. In addition to this or as an alternative, the signal source and the radar target simulator are not synched. Further additionally or further alternatively, the signal receiver and the radar target simulator are not synched. Advantageously, for example, as indicated above, there is no need for any synchronization, thereby further increasing efficiency.

According to an implementation form of the first aspect of the present disclosure, the measurement device and the radar target simulator are not synched. Advantageously, for instance, is noted above, efficiency can further be increased.

According to an implementation form of the first aspect of the present disclosure, the system comprises the radar target simulator. Advantageously, for example, a radar target simulator with self-testing functionality can be implemented.

According to an implementation form of the first aspect of the present disclosure, the system or the radar target simulator comprises a radar reflecting element, especially being arrangeable and/or arranged on the radar target simulator. Advantageously, for instance, especially before adding absorbers, arranging such a radar reflecting element can efficiently increase the corresponding reflection.

According to a second aspect of the present disclosure, a method for characterizing a radar target simulator is provided. Said method comprises the steps of providing a known radar signal for the radar target simulator, especially with the aid of a signal source, receiving the correspondingly reflected radar signal, caused by the known radar signal, from a front of the radar target simulator, and in addition receiving the correspondingly simulated radar response signal to the known radar signal from the radar target simulator and/or to measure the correspondingly outgoing simulated radar signal as response to the known radar signal from the radar target simulator, especially with the aid of a signal receiver, characterizing the reflected radar signal and the simulated radar response signal and/or the outgoing simulated radar signal in time and/or frequency shift, especially with the aid of the signal receiver, and/or characterizing the simulated radar response signal and/or the outgoing simulated radar signal in frequency compared to the reflected radar signal, especially with the aid of the signal receiver.

Advantageously, a radar target simulator can be characterized in a particularly accurate and efficient manner. In particular, the method allows for a traceable characterization of radar target simulators for the parameters distance, velocity and radar cross section. Further advantageously, not only the radar target simulator can be characterized but also the radar target simulator with the corresponding air gap. As an additional advantage, it is noted that there is no need for any synchronization, thereby significantly increasing efficiency.

According to an implementation form of the second aspect of the present disclosure, the method further comprises the step of using the reflected radar signal and the simulated radar response signal and/or the outgoing simulated radar signal characterized in time and/or frequency shift for distance calibration of the radar target simulator, especially with the aid of the signal receiver. Advantageously, for instance, distance calibration can be performed in a particularly accurate and efficient manner.

According to an implementation form of the second aspect of the present disclosure, the method further comprises the step of using the simulated radar response signal and/or the outgoing simulated radar signal characterized in frequency compared to the reflected radar signal for doppler calibration of the radar target simulator, especially with the aid of the signal receiver. Advantageously, for example, doppler calibration can be performed in a particularly accurate and efficient manner.

According to an implementation form of the second aspect of the present disclosure, the method further comprises the step of varying the corresponding radar cross section in the radar target simulator especially to calibrate across the respective range, preferably with the aid of the signal receiver. Advantageously, for instance, calibration can further be improved.

According to an implementation form of the second aspect of the present disclosure, the method further comprises the step of varying the corresponding doppler shift and/or distance in the radar target simulator especially to calibrate across different doppler distances, preferably with the aid of the signal receiver. Advantageously, for example, calibration can additionally be enhanced.

According to an implementation form of the second aspect of the present disclosure, the method further comprises the step of omitting any synchronization with respect to the radar target simulator especially in the context of characterizing the radar target simulator. Advantageously, for instance, efficiency can significantly be increased.

According to an implementation form of the second aspect of the present disclosure, the method further comprises the step of doing 3 or 4 across various continuous wave frequencies of the correspondingly transmitted signal. Advantageously, the method can further be improved.

According to an implementation form of the second aspect of the present disclosure, the method further comprises the step of arranging a radar reflecting element on the radar target simulator, preferably on the front, especially a front end, of the radar target simulator. Advantageously, for instance, especially before adding absorbers, arranging such a radar reflecting element can efficiently increase the corresponding reflection.

The above description with regard to the system according to the first aspect of the present disclosure is correspondingly valid for the method according to the second aspect of the present disclosure, and vice versa.

BRIEF DESCRIPTION OF THE DRAWINGS

The above-described aspects and implementation forms of the present disclosure will be explained in the following description of specific embodiments in relation to the enclosed drawings, in which.

DETAILED DESCRIPTIONS OF EMBODIMENTS

Figure 1:
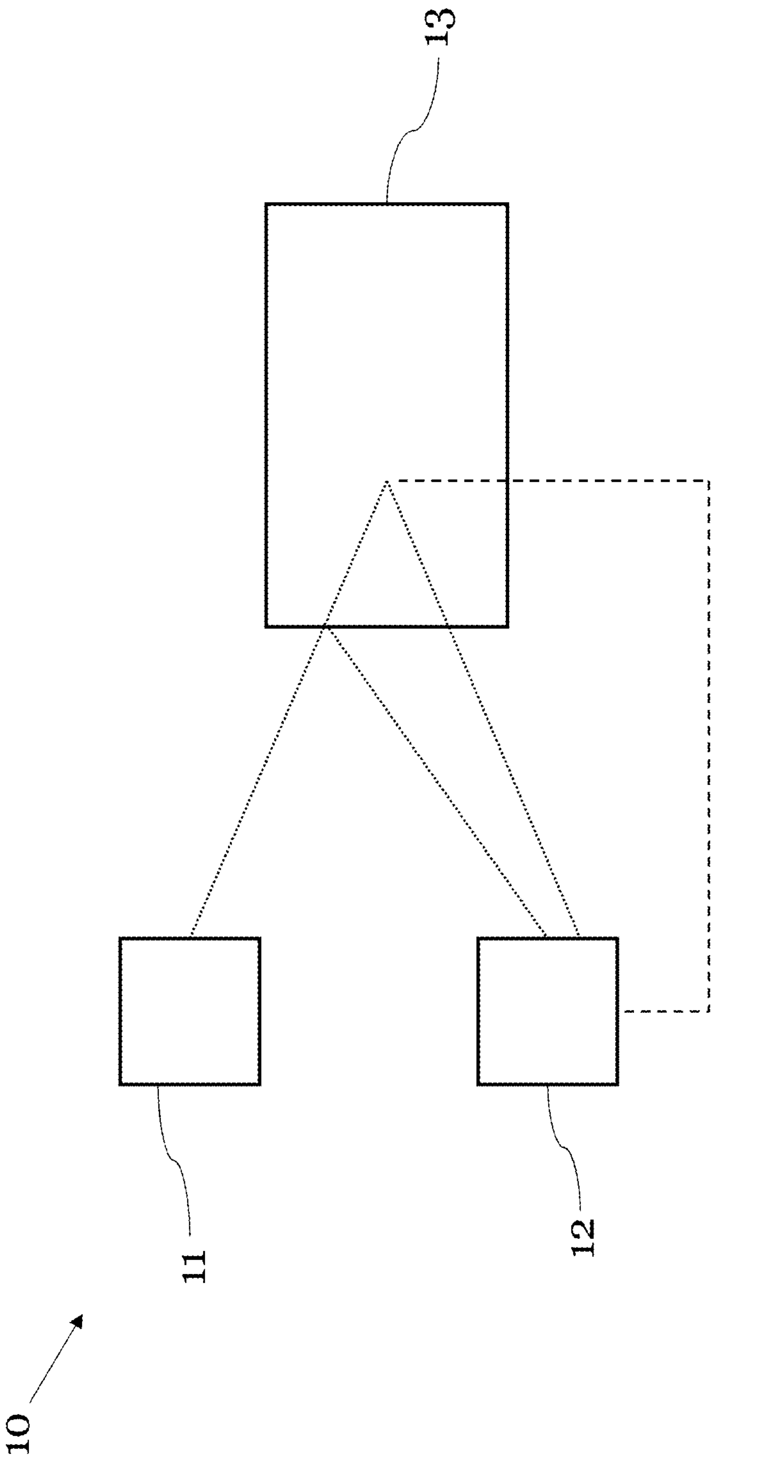
FIG. 1 shows a block diagram of an exemplary embodiment of a system for characterizing a radar target simulator.

FIG. 1 depicts a block diagram of an exemplary embodiment of a system 10 for characterizing a radar target simulator 13. Said system 10 comprises a signal source 11 configured to provide a known radar signal for the radar target simulator 13, and a signal receiver 12 configured to receive the correspondingly reflected radar signal, caused by the known radar signal, from a front of the radar target simulator 13, and in addition to receive the correspondingly simulated radar response signal to the known radar signal from the radar target simulator 13 and/or to measure the correspondingly outgoing simulated radar signal as response to the known radar signal from the radar target simulator 13.

In this context, the system 10 or the signal receiver 12 is configured to characterize the reflected radar signal and the simulated radar response signal and/or the outgoing simulated radar signal in time and/or frequency shift.

In addition to this or as an alternative, the system 10 or the signal receiver 12 is configured to characterize the simulated radar response signal and/or the outgoing simulated radar signal in frequency compared to the reflected radar signal.

With respect to the above-mentioned receiving the correspondingly simulated radar response signal to the known radar signal from the radar target simulator 13, it is noted that it might be particularly advantageous if the system 10 or the signal receiver 12 is connected to the radar target simulator 13. In this context, the radar target simulator 13 may comprise an interface configured to provide said simulated radar response signal.

Furthermore, it might be particularly advantageous if the system 10 or the signal receiver 12 is configured to use the reflected radar signal and the simulated radar response signal and/or the outgoing simulated radar signal characterized in time and/or frequency shift for distance calibration of the radar target simulator 13.

With respect to the above-mentioned front of the radar target simulator 13, it is noted that it might be particularly advantageous if the front of the radar target simulator 13 comprises or is a front end of the radar target simulator 13.

Moreover, it might be particularly advantageous if the system 10 or the signal receiver 12 is configured to use the simulated radar response signal and/or the outgoing simulated radar signal characterized in frequency compared to the reflected radar signal for doppler calibration of the radar target simulator 13.

With respect to the system 10, it is noted that the system 10 can comprise or be a measurement device comprising the signal source 11 and/or the signal receiver 12. Said measurement device can comprise or be a time domain reflectometry measurement device, a spectrum analyzer, a vector network analyzer, or any combination thereof.

With respect to the above-mentioned measurement device, it is noted that it might be particularly advantageous if the measurement device is power calibrated especially to calculate the corresponding radar cross section.

Again, with respect to the system 10 or the signal receiver 12, respectively, it is noted that it might be particularly advantageous if the system 10 or the signal receiver 12 is configured to vary the corresponding radar cross section in the radar target simulator 13 especially to calibrate across the respective range.

Furthermore, it might be particularly advantageous if the system 10 or the signal receiver 12 is configured to vary the corresponding doppler shift and/or distance in the radar target simulator 13 especially to calibrate across different doppler distances.

It is further noted that it might be particularly advantageous if the system 10 and the radar target simulator 13 are not synched, and/or the signal source 11 and the radar target simulator 13 are not synched, and/or the signal receiver 12 and the radar target simulator 13 are not synched. By analogy therewith, with respect to the above-mentioned measurement device, it might be particularly advantageous if the measurement device and the radar target simulator 13 are not synched.

Moreover, it is to be mentioned that the system 10 can comprise the radar target simulator 13. Accordingly, the system 10 can comprise the signal source 11, the signal receiver 12 and the radar target simulator 13, or the system 10 can comprise the above-mentioned measurement device and the radar target simulator 13, respectively.

It is noted that it might be particularly advantageous if the system 10 or the radar target simulator 13 comprises a radar reflecting element, especially being arrangeable and/or arranged on the radar target simulator 13. Said radar reflecting element may especially be used for calibration of the radar target simulator 13. The radar reflecting element can exemplarily be arranged on the front or front end of the radar target simulator 13. The radar reflecting element can exemplarily comprise or be a metal plate.

Figure 2:
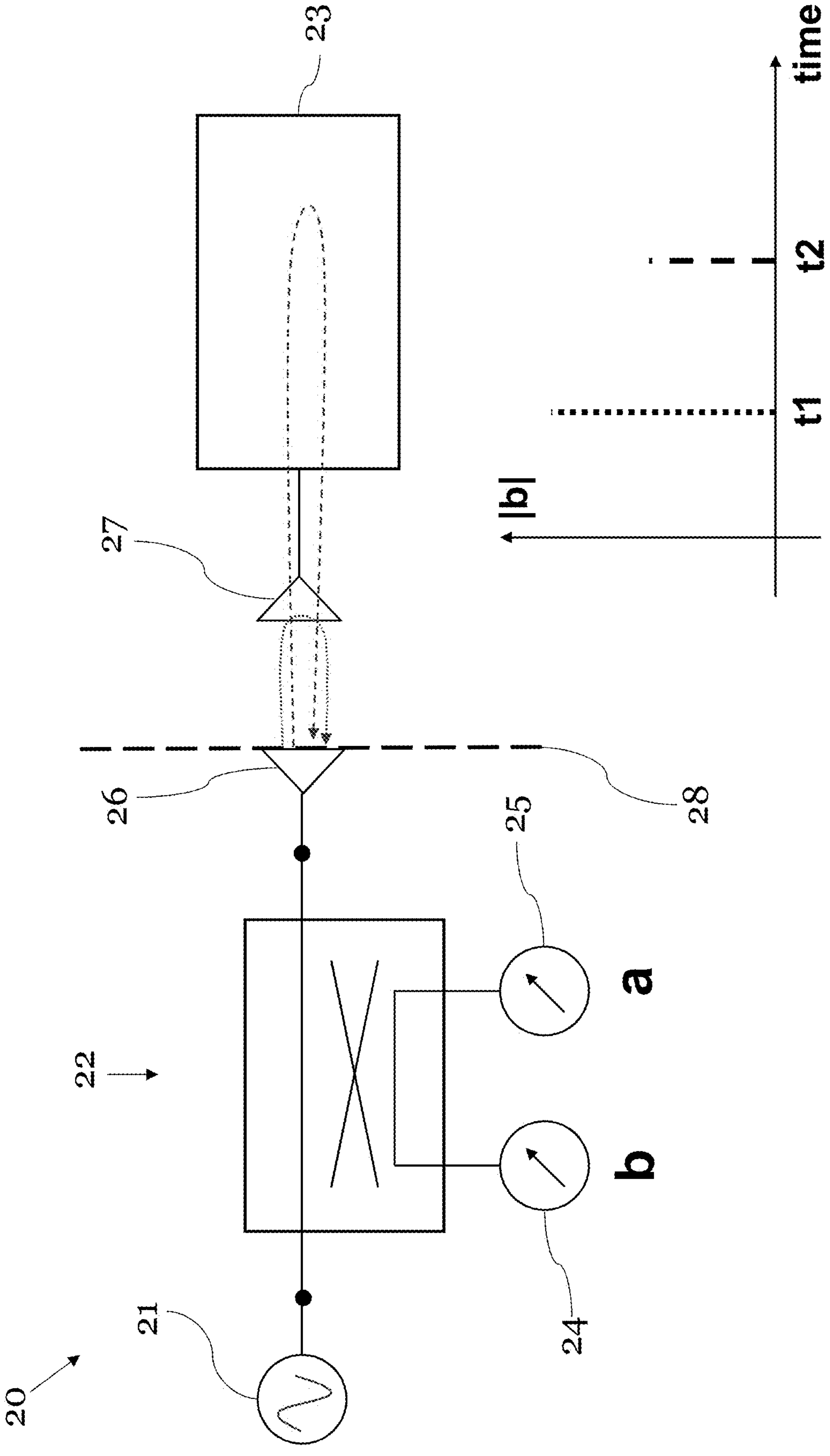
FIG. 2 shows a block diagram of a further exemplary embodiment of a system for characterizing a radar target simulator.

FIG. 2 depicts a block diagram of a further exemplary embodiment of a system 20 for characterizing a radar target simulator 23. The description above regarding the radar target simulator 13 can analogously apply to the radar target simulator 23, and vice versa. Said system 20 comprises a signal source 21. The description above regarding the signal source 11 can analogously apply to said signal source 21, and vice versa.

In addition, the system 20 comprises a measurement device 22. The description above regarding the above-mentioned measurement device can analogously apply to the measurement device 22, and vice versa.

Exemplarily, the signal source 21 is connected to the measurement device 22. The signal source 21 provides the known radar signal for the measurement device 22. Further exemplarily, the measurement device is connected to a measurement device front end 26. The measurement device 22 provides the known radar signal for the radar target simulator 23 or for a front end 27 connected to the radar target simulator 23, respectively, via the measurement device front end 26.

As it can further be seen from FIG. 2, the measurement device 22 exemplarily comprises a measuring element 24. The description above regarding the signal receiver 12 can analogously apply to said measuring element 24 or to said measuring element 24 with the measurement device front end 26, respectively, and vice versa.

It is noted that the measurement device 22 may further comprise a further measuring element 25. Said further measuring element 25 can exemplarily be configured to measure the known radar signal. Accordingly, even for the case that the radar signal provided by the signal source 21 would deviate from the desired known radar signal, the knowledge about the radar signal provided by the signal source 21 is still correct.

It is further noted that FIG. 2 additionally presents a time-amplitude diagram with respect to the measuring element 24. Exemplarily, at a first point of time t1, the corresponding reflection on the front end 27 of the radar target simulator 23 or the correspondingly reflected radar signal, caused by the known radar signal, respectively, has been arrived at the measurement device front end 26. At a second point of time t2, the simulated radar object or the correspondingly outgoing simulated radar signal, respectively, has been arrived. The measurement device front end 26 may especially be understood as a reference plane 28. It might be particularly advantageous if the system 20 is used for characterization of object distances.

With respect to the each of the above-mentioned measuring element 24 and the further measuring element 25, it is noted that it might be particularly advantageous if at least one or each of said measuring elements 24, 25 comprises or is voltage measuring element, a current measuring element, a power measuring element, or any combination thereof.

Figure 3:
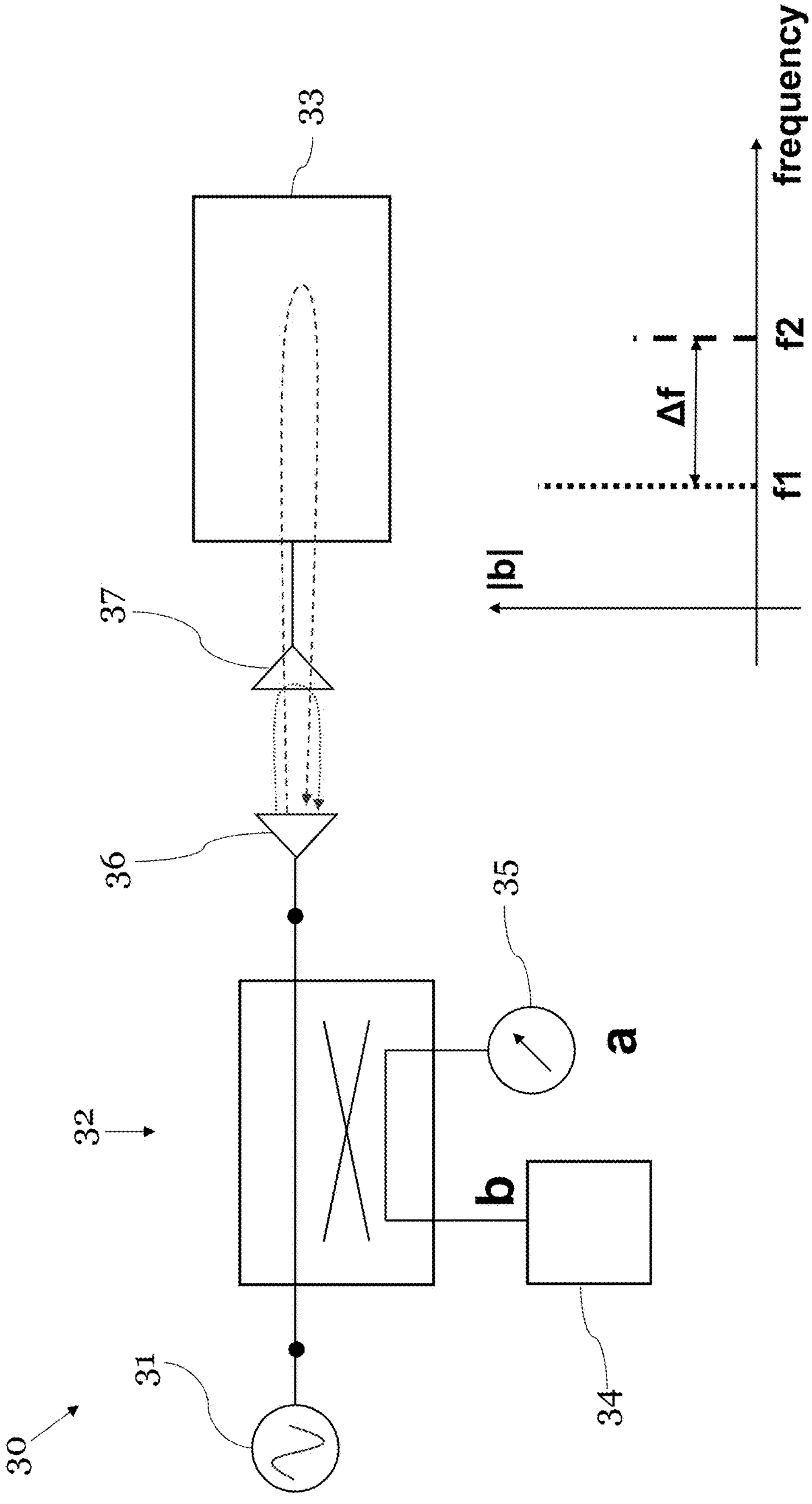
FIG. 3 shows a block diagram of a further exemplary embodiment of a system for characterizing a radar target simulator.

Now, with respect to FIG. 3, a block diagram of a further exemplary embodiment of a system 30 for characterizing a radar target simulator is illustrated. Said system 30 is based on the system 20 of FIG. 2 with the difference that the measuring element 24 has been replaced by a spectrum analyzing element 34 or a spectrum analyzer, respectively.

With respect to the remaining parts of the system 30 of FIG. 3, it is noted that the description above regarding the corresponding parts 21, 22, 23, 25, 26, 27 according to FIG. 2 can analogously apply to the parts 31, 32, 33, 35, 36, 37 of FIG. 3, and vice versa.

It is further noted that FIG. 3 additionally presents a frequency-amplitude diagram with respect to the spectrum analyzing element 34 or spectrum analyzer, respectively. Exemplarily, at a first frequency f1, the corresponding reflection on the front end 37 of the radar target simulator 37 or the correspondingly reflected radar signal, caused by the known radar signal, respectively, has been arrived at the measurement device front end 36. At a second frequency f2, the simulated radar object, especially shifted by $\Delta f$ (Doppler shift), or the correspondingly outgoing simulated radar signal, respectively, has been arrived. It might be particularly advantageous if the system 20 is used for characterization of object Doppler shift.

Figure 4:
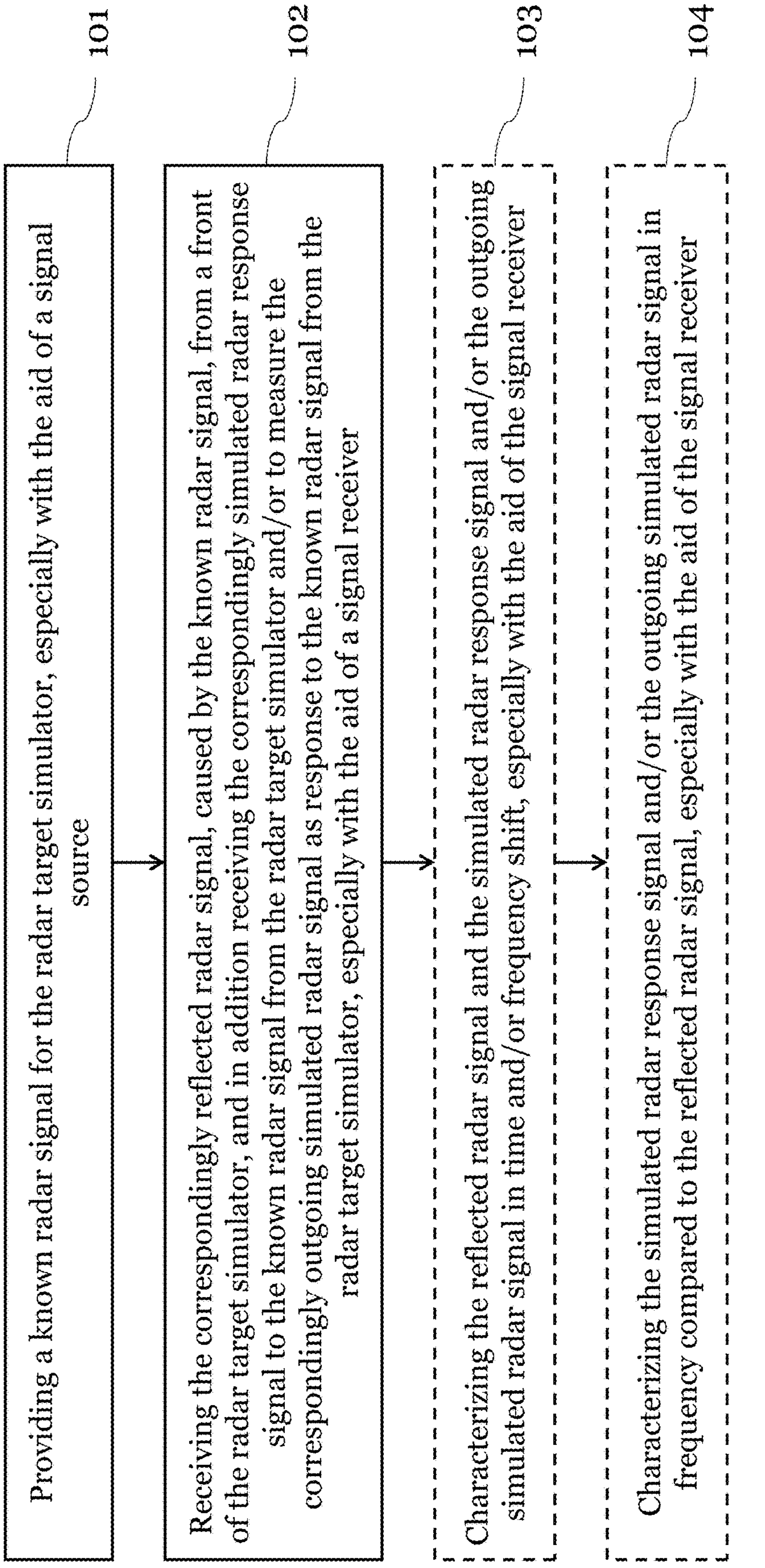
FIG. 4 shows a flow diagram of an exemplary embodiment of a method for characterizing a radar target simulator.

Now, with respect to FIG. 4, a flow chart of an exemplary embodiment of a method for characterizing a radar target simulator is depicted. It might be particularly advantageous if said method uses any of the systems 10, 20, or 30 described above.

A first step 101 comprises providing a known radar signal for the radar target simulator, especially with the aid of a signal source such as any of the above-mentioned signal sources 11, 21, 31. A second step 102 comprises receiving the correspondingly reflected radar signal, caused by the known radar signal, from a front of the radar target simulator, and in addition receiving the correspondingly simulated radar response signal to the known radar signal from the radar target simulator and/or to measure the correspondingly outgoing simulated radar signal as response to the known radar signal from the radar target simulator, especially with the aid of a signal receiver such as the above-mentioned signal receiver 12, the measuring element 24 or the measurement device 22, respectively, or the spectrum analyzing element 34 or the measurement device 32, respectively.

Exemplarily, a further step 103 comprises characterizing the reflected radar signal and the simulated radar response signal and/or the outgoing simulated radar signal in time and/or frequency shift, especially with the aid of the signal receiver. Especially in addition or as an alternative to said step 103, step 104 exemplarily comprises characterizing the simulated radar response signal and/or the outgoing simulated radar signal in frequency compared to the reflected radar signal, especially with the aid of the signal receiver.

Figure 5:
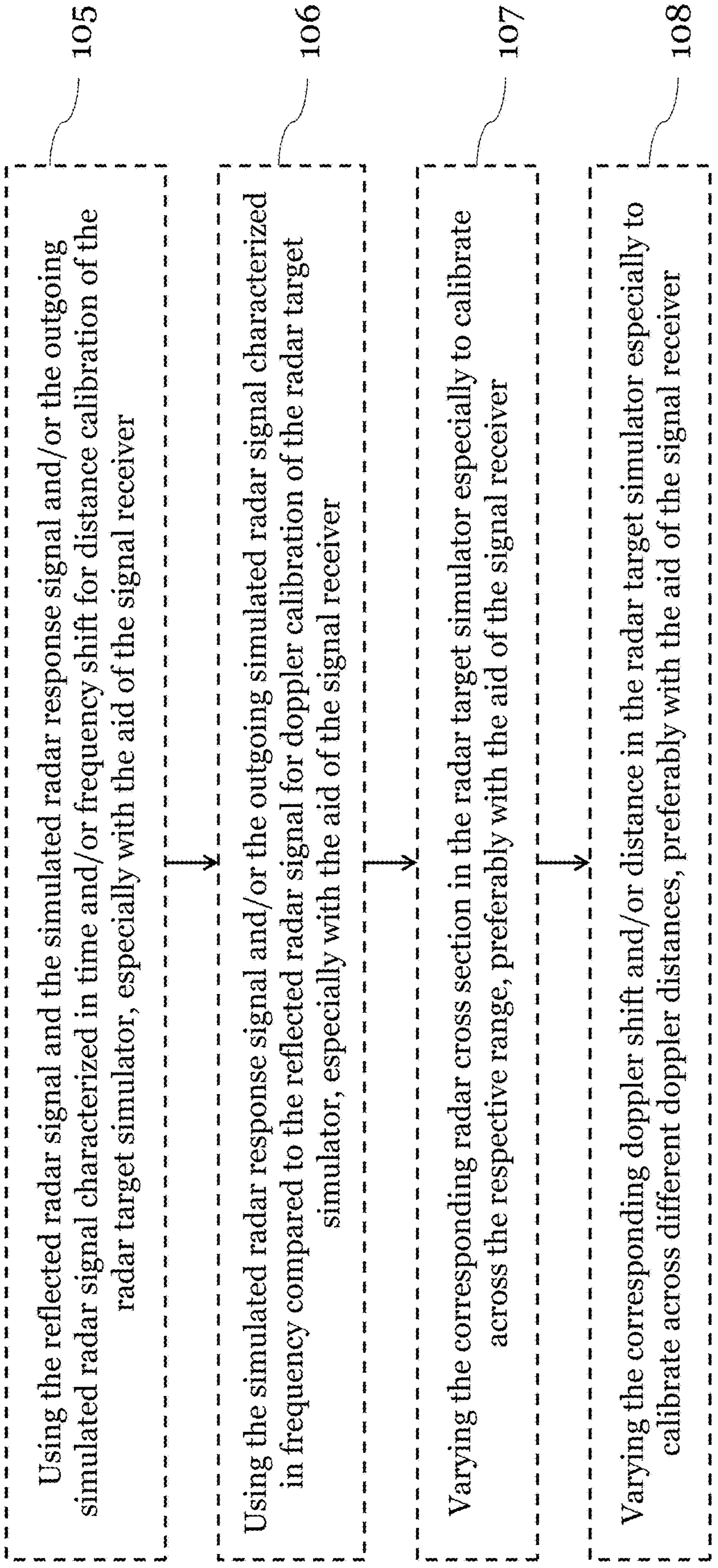
FIG. 5 shows a flow diagram of a further exemplary embodiment of a method for characterizing a radar target simulator.

According to step 105 of FIG. 5, it might be particularly advantageous if the method further comprises using the reflected radar signal and the simulated radar response signal and/or the outgoing simulated radar signal characterized in time and/or frequency shift for distance calibration of the radar target simulator, especially with the aid of the signal receiver.

Furthermore, in accordance with step 106 of said FIG. 5, the method may further comprise using the simulated radar response signal and/or the outgoing simulated radar signal characterized in frequency compared to the reflected radar signal for doppler calibration of the radar target simulator, especially with the aid of the signal receiver.

Moreover, as it can be seen from step 107 of FIG. 5, it might be particularly advantageous if the method further comprises varying the corresponding radar cross section in the radar target simulator especially to calibrate across the respective range, preferably with the aid of the signal receiver.

It is noted that it might be particularly advantageous if the method further comprises varying the corresponding doppler shift and/or distance in the radar target simulator especially to calibrate across different doppler distances, preferably with the aid of the signal receiver, as exemplarily illustrated by step 108 of FIG. 5.

Figure 6:
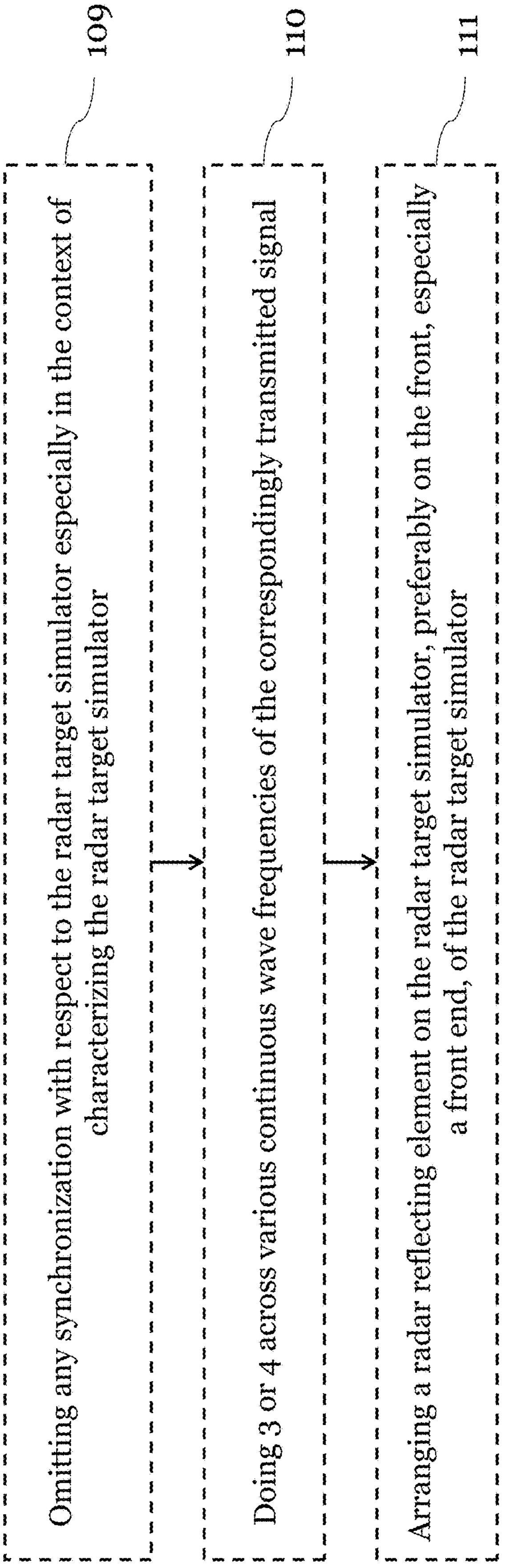
FIG. 6 shows a flow diagram of a further exemplary embodiment of a method for characterizing a radar target simulator.

As exemplarily depicted by step 109 of FIG. 6, it is further noted that it might be particularly advantageous if the method further comprises omitting any synchronization with respect to the radar target simulator especially in the context of characterizing the radar target simulator.

Furthermore, according to step 110 of said FIG. 6, the method may further comprise doing 3 or 4 across various continuous wave frequencies of the correspondingly transmitted signal.

Moreover, in accordance with step 111 of said FIG. 6, it might be particularly advantageous if the method further comprises arranging a radar reflecting element on the radar target simulator, preferably on the front, especially a front end, of the radar target simulator.

All features described above or features shown in the figures can be combined with each other in any advantageous manner within the scope of the disclosure.

The invention claimed is:

1. A system for characterizing a radar target simulator, comprising:

a signal source configured to provide a known radar signal for the radar target simulator, and a signal receiver configured to receive the correspondingly reflected radar signal, caused by the known radar signal, from a front of the radar target simulator, and in addition to receive the correspondingly simulated radar response signal to the known radar signal from the radar target simulator, wherein the system or the signal receiver is configured to characterize the reflected radar signal and the simulated radar response signal in time shift.

2. The system according to claim 1, wherein the system or the signal receiver is configured to use the reflected radar signal and the simulated radar response signal characterized in time shift for distance calibration of the radar target simulator, and/or wherein the front of the radar target simulator comprises or is a front end of the radar target simulator.

3. The system according to claim 1, wherein the system or the signal receiver is configured to use the simulated radar response signal characterized in frequency compared to the reflected radar signal for doppler calibration of the radar target simulator.

4. The system according to claim 1, wherein the system comprises or is a measurement device comprising the signal source and/or the signal receiver.

5. The system according to claim 4, wherein the measurement device comprises or is a time domain reflectometry measurement device, a spectrum analyzer, or a vector network analyzer.

6. The system according to claim 4, wherein the measurement device is power calibrated to calculate the corresponding radar cross section.

7. The system according to claim 1, wherein the system or the signal receiver is configured to vary the corresponding radar cross section in the radar target simulator to calibrate across the respective range.

8. The system according to claim 1, wherein the system or the signal receiver is configured to vary the corresponding doppler shift and/or distance in the radar target simulator to calibrate across different doppler distances.

9. The system according to claim 1, wherein the system and the radar target simulator are not synched, and/or wherein the signal source and the radar target simulator are not synched, and/or wherein the signal receiver and the radar target simulator are not synched.

10. The system according to claim 4, wherein the measurement device and the radar target simulator are not synched.

11. The system according to claim 1, wherein the system comprises the radar target simulator.

12. The system according to claim 11, wherein the system or the radar target simulator comprises a radar reflecting element, being arrangeable and/or arranged on the radar target simulator.

13. A method for characterizing a radar target simulator, comprising the steps of:

providing a known radar signal for the radar target simulator with the aid of a signal source, receiving the correspondingly reflected radar signal, caused by the known radar signal, from a front of the radar target simulator, and in addition receiving the correspondingly simulated radar response signal to the known radar signal from the radar target simulator with the aid of a signal receiver, and characterizing the reflected radar signal and the simulated radar response signal in time shift with the aid of the signal receiver.

14. The method according to claim 13, wherein the method further comprises the step of:

using the reflected radar signal and the simulated radar response signal characterized in time shift for distance calibration of the radar target simulator with the aid of the signal receiver.

15. The method according to claim 13, wherein the method further comprises the step of:

using the simulated radar response signal characterized in frequency compared to the reflected radar signal for doppler calibration of the radar target simulator with the aid of the signal receiver.

16. The method according to claim 13, wherein the method further comprises the step of:

varying the corresponding radar cross section in the radar target simulator to calibrate across the respective range with the aid of the signal receiver.

17. The method according to claim 13, wherein the method further comprises the step of:

varying the corresponding doppler shift and/or distance in the radar target simulator to calibrate across different doppler distances with the aid of the signal receiver.

18. The method according to claim 13, wherein the method further comprises the step of:

omitting any synchronization with respect to the radar target simulator in the context of characterizing the radar target simulator.

19. The method according to claim 13, wherein the method further comprises the step of:

varying the corresponding radar cross section in the radar target simulator across various continuous wave frequencies of the correspondingly transmitted signal, or varying the corresponding doppler shift and/or distance in the radar target simulator across various continuous wave frequencies of the correspondingly transmitted signal.

20. The method according to claim 13, wherein the method further comprises the step of:

arranging a radar reflecting element on a front end of the radar target simulator.

* * * * *